3,148,028
METHOD FOR THE PREPARATION OF DIBORANE

Robert D. Schultz, East Whittier, and Carl L. Randolph, Jr., Whittier, Calif., assignors to Aerojet-General Corporation, Azusa, Calif., a corporation of Ohio
No Drawing. Filed June 24, 1955, Ser. No. 517,941
2 Claims. (Cl. 23—204)

This invention relates to a new and improved method of preparing diborane.

Diborane is an excellent high energy fuel. Unfortunately, however, its use has been severely limited due to a lack of a convenient and inexpensive method for preparing it in high yield.

Heretofore, diborane has been prepared by reacting alkali metal borohydrides with hydrogen chloride gas at room temperature or with liquid hydrogen chloride at a temperature of about −78° C. These methods are very slow, requiring reaction times on the order of from about 10 to 24 hours. In addition, the separation of diborane from the resulting 70% diborane–30% hydrogen chloride azeotropic mixture is very difficult.

It has long been desired as a matter of cost, convenience and commercial feasibility, to produce diborane by using sulfuric acid as the protolyzing acid, preferably at room temperature. It has been found, however, that when alkali-metal borohydrides are reacted with concentrated sulfuric acid, boron oxides are produced with explosive violence, instead of diborane. In an attempt to avoid this undesirable oxidation, previous workers have employed dilute sulfuric acid in the reaction. Although the borohydride-dilute sulfuric acid reaction was not explosive, hydrolysis occurred producing boric acid instead of diborane.

We have now found that diborane is rapidly and safely produced in good yield by reacting a metal borohydride with concentrated sulfuric or chlorosulfonic acid in the presence of a reaction moderator.

The reaction proceeds in accordance with the general reaction scheme set forth below:

$$MBH_4 + H_2SO_4 \rightarrow B_2H_6 + MSO_4$$

wherein M is a metal radical. Due to the non-volatile characteristic of sulfuric acid, an azeotropic mixture of gases is avoided. Although rapid, the reaction proceeds smoothly and gently without sparking, flaming or explosions.

As a matter of convenience, alkali and alkaline earth metal borohydrides, including lithium, sodium, calcium, etc., borohydrides, are usually employed as starting materials. Commercial grade sulfuric acid, ordinarily containing from about 95% to about 98% by weight pure hydrogen sulfate and about 5% to about 2% by weight water, is suitable as the protolyzing acid.

The reaction moderators useful in the practice of this invention are:

I. Higher aliphatic acids, such acids being defined as aliphatic acids having at least six carbon atoms included in the molecule. These include such acids as:

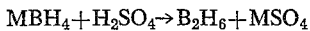

| | |
|---|---|
| Nonylic | Arachidic |
| Capric | Behenic |
| Undecylic | Hyenic |
| Lauric | Melissic |
| Tridecylic | Psyllic |
| Myristic | Pimelic |
| Pentadecylic | Suberic |
| Palmitic | Azelaic |
| Margaric | Sebacic |
| Stearic | Oleic |
| Linoleic | Adipic |

II. Esters of higher aliphatic acids including:

| | |
|---|---|
| Decyl stearate | Methyl stearate |
| Octyl oleate | Butyl oleate |
| Butyl caproate | Diethyl sebacate |

III. Hydroxyalkyl and alkylether esters of higher aliphatic acids including:

| | |
|---|---|
| Sorbitan monostearate | Polyoxyethylene sorbitan trioleate |
| Sorbitan monolaurate | Sorbitan tristearate |
| Polyoxyethylene sorbitan monolaurate | Polyoxyethylene sorbitan dilaurate |
| Polyoxyethylene sorbitan penta-oleate | Polyoxyethylene stearate |
| Polyoxypropylene stearate | Sorbitan trioleate |
| Polyoxyethylene sorbitan monostearate | Polyoxyethylene sorbitan tristearate |
| Diethylene glycol adipate | |

IV. Metal salts of higher aliphatic acids, in particular salts of aluminum and metals of groups I and II of the periodic table, including:

| | |
|---|---|
| Sodium stearate | Aluminum palmitate |
| Tetrasodium n-octadecyl-4-sulfo-4,5-ethylene-carboxylate octanoamate | Zinc stearate |
| | Calcium palmitate |
| | Silver oleate |
| Potassium octanedioate | Sodium palmitate |

V. Sulfo containing esters of aliphatic acids, including:

| | |
|---|---|
| Sodium stearyl sulfo-propionate | Butyl octanoyl sulfo-hexanoate |
| Stearyl butyl sulfonate | Oleic octyl sulfonate |

Any metal salts of a higher aliphatic acid capable of yielding the free acid under hydrolytic conditions can be used in the practice of this invention. Similarly, any ester of a higher aliphatic acid capable of yielding its corresponding free acid under hydrolytic conditions can be used. This is apparent since the reaction conditions are strongly hydrolytic. Thus, the reaction modifiers useful in the practice of this invention are the higher aliphatic acids, namely, those having six or more carbon atoms and the esters and salts thereof.

It will be appreciated that mixtures of acids, esters, or salts as well as mixtures such as acid and ester, salt and ester, etc., can be employed as the reaction moderator of this invention. Similarly, mixtures of concentrated sulfuric and concentrated chlorosulfonic acid can be used as the protolyzing acid, if desired.

In accordance with the present invention, concentrated sulfuric or chlorosulfonic acid containing a higher aliphatic acid or its esters or salts, usually in an amount of from about .005% to about 10% by weight of the protolyzing acid, is reacted with a metal borohydride and diborane gas is evolved. The preferred method of conducting the reaction is to dissolve the reaction moderator in the protolyzing acid and heat if necessary to effect solution. The reaction is preferably conducted in a reactor equipped with a gas outlet leading to a low temperature trap. The acid solution is placed in the reactor and finely divided borohydride added with agitation. During the course of the reaction, a gentle evolution of hydrogen and diborane gases takes place. These gases are vented through the gas outlet and collected in the low temperature trap. If desired, the reaction can also be conducted in vacuum or a nitrogen atmosphere as well as in air.

The mechanism by which the higher aliphatic acid or its esters or salts modifies the sulfuric or chlorosulfonic acid-borohydride reaction has not been definitely established. It is believed, however, that these compounds reduce the surface tension of the sulfuric acid and form a coating about the borohydride particles. The reactants then diffuse into this coating. Bisulfate ions, produced by the dissociation of the sulfuric acid, become concentrated in the coating, thus providing a buffer in the reaction zone. By diffusion of the reactants and buffering of the reaction, the protolysis of the borohydride yielding diborane takes place without undesirable oxidation, which produces boron oxides, or hydrolysis, which produces boric acid.

To more clearly illustrate the invention, the following examples are presented. It is to be understood, however, that these examples are presented merely as a means of illustration, and are not intended to limit the scope of the invention in any way.

EXAMPLE I

*Stearic Acid*

The reaction was carried out by dropping 8-mesh crystals of sodium borohydride into a 1 cc. mixture of commercial grade sulfuric acid and stearic acid, in an amount of .006% by weight of the acid mixture. There was a gentle evolution of gas, which was identified as diborane by the infrared spectrum.

EXAMPLE II

*Lauric Acid*

The reaction was carried out by dropping 8-mesh crystals of sodium borohydride into a 1 cc. mixture of commercial grade sulfuric acid and lauric acid, in an amount of 1% by weight of the acid mixture. There was a gentle evolution of gas, which was identified as diborane by the infrared spectrum.

EXAMPLE III

*Polyoxyethylene Sorbitan Trioleate*

The reaction was carried out by dropping 8-mesh crystals of sodium borohydride into a 10 cc. mixture of commercial grade sulfuric acid and 1 drop of polyoxyethylene sorbitan trioleate, amounting to about 0.5% by weight of the acid mixture. There was a gentle evolution of gas, which was identified as diborane by the infrared spectrum.

EXAMPLE IV

*Sorbitan Monostearate*

The reaction was carried out by dropping 8-mesh crystals of sodium borohydride into a 1 cc. mixture of commercial grade sulfuric acid and sorbitan monostearate, amounting to about 0.5% by weight of the acid mixture. There was a gentle evolution of gas, which was identified as diborane by the infrared spectrum.

EXAMPLE V

*Tetrasodium n-Octadecyl-4-Sulfo-4,5-Ethylenecarboxylate Octanoamate*

The reaction was carried out by dropping 8-mesh crystals of sodium borohydride into a 1 cc. mixture of commercial grade sulfuric acid and tetrasodium n-octadecyl-4-sulfo-4,5-ethylenecarboxylate octanoamate, in an amount of 0.5% by weight of the acid mixture. There was a gentle evolution of gas, which was identified as diborane by the infrared spectrum.

EXAMPLE VI

*Sodium Stearyl Sulfopropionate*

The reaction was carried out by dropping 8-mesh crystals of sodium borohydride into a 10 cc. mixture of commercial grade sulfuric acid and sodium stearyl sulfopropionate, in an amount of 1% by weight of the acid mixture. There was a gentle evolution of gas, which was identified as diborane by the infrared spectrum.

Diborane is an excellent high energy fuel and finds valuable use in conventional liquid bipropellant rockets. When used for such purposes, it is conventional to burn diborane with an oxidizer such as fuming nitric acid in a liquid chamber. The gases thus produced are expelled in the exhaust nozzle and thrust is imparted to the motor thereby producing forward motion in the conventional manner. Diborane also finds valuable use in vulcanizing rubber, as disclosed in United States Patent No. 2,558,559.

The moderated reaction of this invention is readily adaptable to commercial scale batch or continuous processes for the preparation of diborane. The techniques involved in such procedures are considered conventional and within the scope of this invention.

We claim:

1. A method of preparing diborane which comprises reacting a sodium borohydride with concentrated sulfuric acid in the presence of about 0.006% stearic acid.

2. A method of preparing diborane which comprises reacting a sodium borohydride with concentrated sulfuric acid in the presence of about 1% lauric acid.

References Cited in the file of this patent

UNITED STATES PATENTS

| | | |
|---|---|---|
| 2,513,997 | Gibb | July 4, 1950 |
| 2,543,511 | Schlesinger | Feb. 27, 1951 |
| 2,880,068 | Chivas | Mar. 31, 1959 |

OTHER REFERENCES

Karrer: "Organic Chemistry," 1946, 2d English Edition, p. 266.

Wiberg et al.: "Zeitschrift für Naturforschung," Vol. 7b, pp. 58–59 (1952).

Mellor's Modern Inorganic Chemistry, page 483 (1951), Longmans, Green & Co., N.Y.C.

Hurd: "Chemistry of the Hydrides," page 162 (1952), publ. by John Wiley & Sons, N.Y.C.